United States Patent
Roth et al.

(10) Patent No.: US 11,690,045 B2
(45) Date of Patent: Jun. 27, 2023

(54) TRANSPORT BLOCK SIZE (TBS) DETERMINATION FOR NR-V2X SIDELINK WITH PSCCH SIGNALING FOR MULTI TRANSMISSION TIME INTERVAL (TTI) TRANSMISSIONS

(71) Applicant: Intel Corporation, Santa Clara, CA (US)

(72) Inventors: Kilian Peter Anton Roth, Munich (DE); Alexey Khoryaev, Nizhny Novgorod (RU); Mikhail Shilov, Nizhny Novgorod (RU); Sergey Panteleev, Nizhny Novgorod (RU); Leonardo Gomes Baltar, Munich (DE)

(73) Assignee: Intel Corporation, Santa Clara, CA (US)

( * ) Notice: Subject to any disclaimer, the term of this patent is extended or adjusted under 35 U.S.C. 154(b) by 245 days.

(21) Appl. No.: 16/987,001

(22) Filed: Aug. 6, 2020

(65) Prior Publication Data

US 2020/0404624 A1 Dec. 24, 2020

Related U.S. Application Data

(60) Provisional application No. 62/888,279, filed on Aug. 16, 2019, provisional application No. 62/888,278, (Continued)

(51) Int. Cl.
*H04W 72/02* (2009.01)
*H04W 72/04* (2023.01)
(Continued)

(52) U.S. Cl.
CPC .......... *H04W 72/02* (2013.01); *H04B 7/0626* (2013.01); *H04L 5/0051* (2013.01);
(Continued)

(58) Field of Classification Search
None
See application file for complete search history.

(56) References Cited

FOREIGN PATENT DOCUMENTS

WO  WO-2018175528 A1 * 9/2018  ........... H04L 5/0087
WO  WO-2020068252 A1 * 4/2020  ............... H04L 1/08

OTHER PUBLICATIONS

Physical Layer procedures for Data—3GPP TS 38.214 V15.3.0 Release 15 (Oct. 2018) (Year: 2018).*

(Continued)

*Primary Examiner* — Yemane Mesfin
*Assistant Examiner* — Jeff Banthrongsack
(74) *Attorney, Agent, or Firm* — Schwegman Lundberg & Woessner, P.A.

(57) ABSTRACT

A user equipment (UE) configured for New Radio (NR) vehicle-to-everything (V2X) (NR V2X) sidelink transmission in a fifth generation (5G) network may determine a transport block size (TBS) for transmission of a transport block (TB) within a current sidelink slot. The UE is configured to encode a physical sidelink shared channel (PSCCH) for transmission within the current sidelink slot. The PSCCH may be encoded to include sidelink control information (SCI). The SCI may indicate a reservation of physical sidelink shared channel (PSSCH) resources within up to three sidelink slots including the current sidelink slot 102. To determine the TBS, the UE may determine number of resource elements (REs) within the current sidelink slot 102 that are available for transmission of the PSSCH by excluding certain REs of the current sidelink slot. For transmission of the TB within multiple transmission time intervals (TTIs), the UE may be configured to encode the SCI to indicate a reservation of PSSCH resources for each of the multiple TTIs within the current scheduling window.

20 Claims, 5 Drawing Sheets

Related U.S. Application Data filed on Aug. 16, 2019, provisional application No. 62/911,904, filed on Oct. 7, 2019.

(51) Int. Cl.

| | |
|---|---|
| *H04W 72/12* | (2023.01) |
| *H04W 52/52* | (2009.01) |
| *H04L 5/00* | (2006.01) |
| *H04L 5/10* | (2006.01) |
| *H04W 72/0446* | (2023.01) |
| *H04W 72/1263* | (2023.01) |
| *H04W 28/26* | (2009.01) |
| *H04B 7/06* | (2006.01) |
| *H04W 4/40* | (2018.01) |
| *H04W 92/18* | (2009.01) |

(52) U.S. Cl.
CPC .................. *H04L 5/10* (2013.01); *H04W 4/40* (2018.02); *H04W 28/26* (2013.01); *H04W 52/52* (2013.01); *H04W 72/0446* (2013.01); *H04W 72/1263* (2013.01); *H04W 92/18* (2013.01)

(56) References Cited

OTHER PUBLICATIONS

"3GPP TR 38.885 V16.0.0", 3rd Generation Partnership Project;Technical Specification Group Radio Access Network;NR;Study on NR Vehicle-to-Everything (V2X)(Release 16), (Mar. 2019), 122 pgs.
"3GPP TSG RAN Meeting #83 RP-190766", New WID on 5G V2X with NR sidelink LG Electronics, Huawei, (Mar. 2019), 8 pgs.
"ETSI TS 138 214 V15.3.0", 5G;NR;Physical layer procedures for data(3GPP TS 38.214 version 15.3.0 Release 15), (Oct. 2018), 99 pgs.

* cited by examiner

TRANSPORT BLOCK SIZE (TBS) DETERMINATION FOR NR-V2X SIDELINK WITH PSCCH SIGNALING FOR MULTI TRANSMISSION TIME INTERVAL (TTI) TRANSMISSIONS

PRIORITY CLAIMS

This application claims priority under 35 U.S.C. 119(e) to U.S. Provisional Patent Application Ser. No. 62/888,279 filed Aug. 16, 2019 [reference number AC4415-Z], Ser. No. 62/911,904 filed Oct. 7, 2019 [reference number AC5464-Z], and Ser. No. 62/888,278 filed Aug. 16, 2019 [reference number AC4436-Z] which are incorporated herein by reference in their entirety.

TECHNICAL FIELD

Embodiments pertain to wireless communications. Some embodiments relate to fifth generation (5G) new radio (NR) communications. Some embodiments pertain to NR vehicle-to-everything (V2X) sidelink communications.

BACKGROUND

One issue with NR vehicle-to-everything (V2X) sidelink communication is determination of the transport block size (TBS) because of the way the resource elements (REs) of a sidelink slot are allocated. Another issue with NR V2X sidelink communication is resource signalling.

Thus, there are general needs for TBS determination for NR V2X sidelink communications and efficient and flexible resource signalling for NR V2X sidelink communications.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments are directed to TBS determination for NR-V2X sidelink communication. Some embodiments are directed to 5G-NR PSCCH Signaling for Multi TTI Transmissions. In accordance with some embodiments, a user equipment (UE) is configured for New Radio (NR) vehicle-to-everything (V2X) (NR V2X) sidelink transmission in a fifth generation (5G) network. The UE may comprise processing circuitry and memory. These embodiments are described in more detail below.

Figure 1:
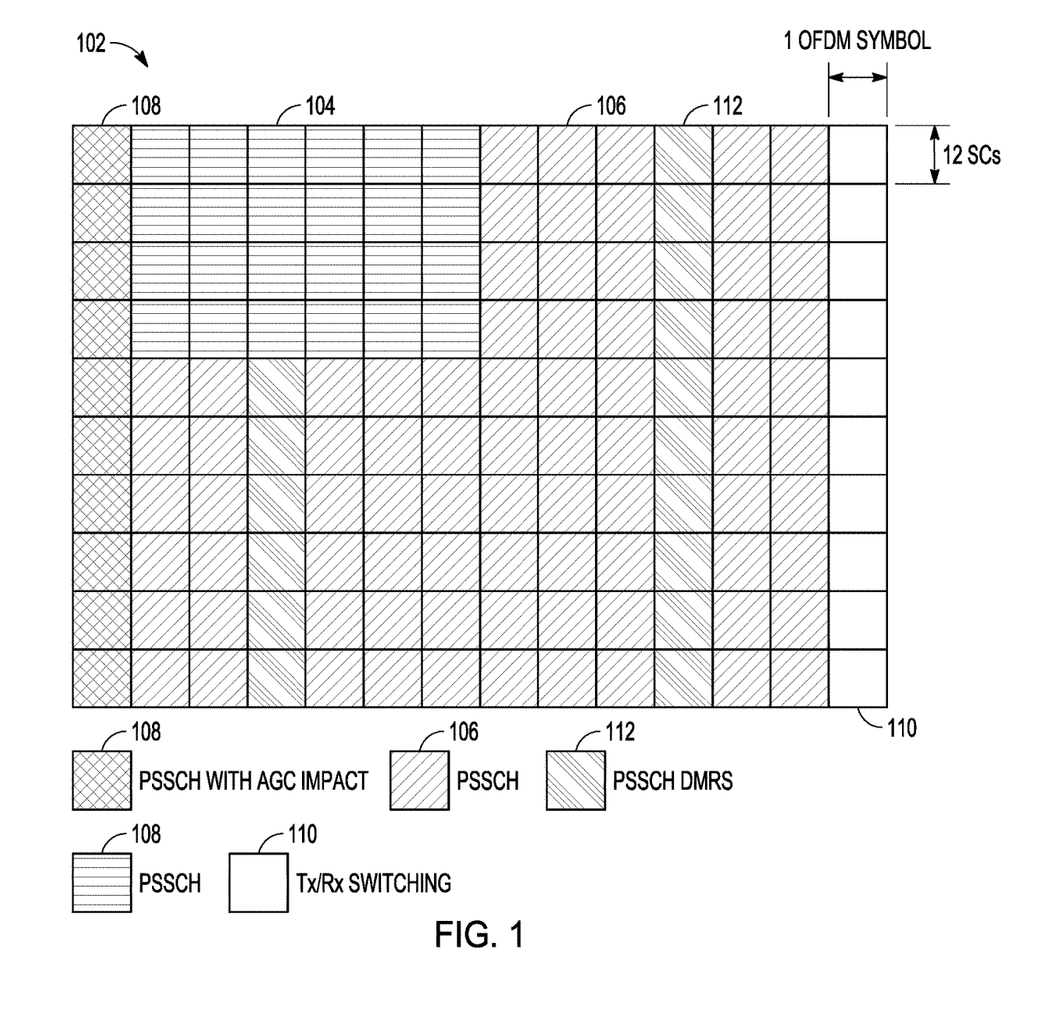
FIG. 1 illustrates a sidelink slot having a sub-channel configuration with ten physical resource blocks (PRBs) per sub-channel and a specific physical sidelink control channel (PSCCH) allocation in accordance with some embodiments.

FIG. 1 illustrates a sidelink slot having a sub-channel configuration with ten physical resource blocks (PRBs) per sub-channel and a specific physical sidelink control channel (PSCCH) allocation in accordance with some embodiments. In accordance with some embodiments, when a UE is operating as a transmitting (TX) UE, the UE is configured to determine a transport block size (TBS) for transmission of a transport block (TB) within a current sidelink slot 102. The UE is configured to encode a physical sidelink shared channel (PSCCH) 104 for transmission within the current sidelink slot 102. The PSCCH 104 may be encoded to include sidelink control information (SCI). In these embodiments, the SCI may be configured to indicate a reservation of physical sidelink shared channel (PSSCH) resources 106 within up to three sidelink slots including the current sidelink slot 102. In some embodiments, the UE may encode a PSSCH for transmission within available PSSCH resources 106 of the current sidelink slot 102. The PSSCH transmission may comprise the TB and the TB have a payload size based on the TBS.

In some embodiments, to determine the TBS, the UE is configured to determine number of resource elements (REs) within the current sidelink slot 102 that are available for transmission of the PSSCH by excluding REs of the current sidelink slot. In some embodiments, the UE may, for example, at least exclude REs of the current sidelink slot occupied by the PSCCH 104. In some embodiments, the UE may also exclude REs of the current sidelink slot occupied by sidelink PSSCH demodulation reference signals (DMRS) 112 based on a sidelink PSSCH DMRS time pattern indicated by higher layers. In some embodiments, the UE may also exclude REs of the current sidelink slot that include a physical sidelink feedback channel (PSFCH) 114 (see FIG. 3) based on a PSFCH period indicated by the higher layers, if the PSFCH 114 is configured for the current sidelink slot.

Figure 3:
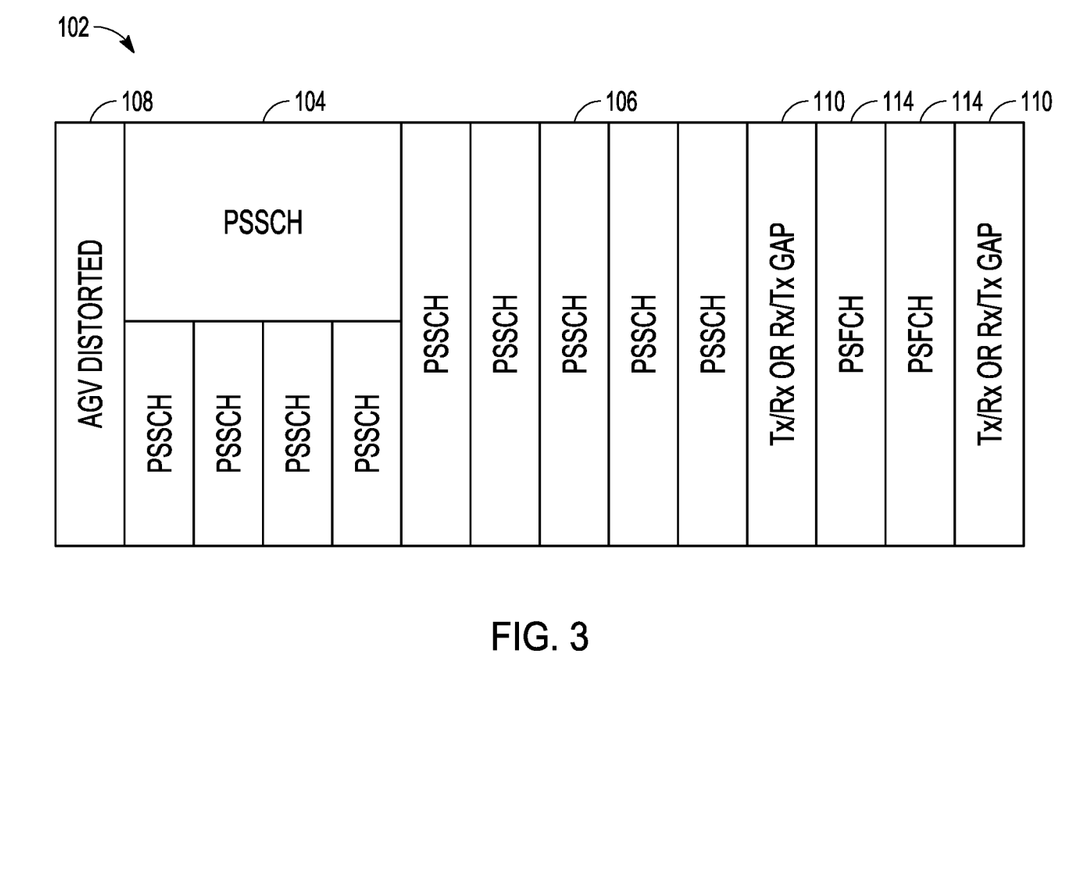
FIG. 3 illustrates a sidelink slot with an allocated physical sidelink feedback channel (PSFCH) in accordance with some embodiments.

In some embodiments, REs for the second stage PSCCH, which is transmitted in the PSSCH, may also be excluded when determining the TBS. In some embodiments, the SCI may indicate a reservation of PSSCH resources within more than three sidelink slots (e.g., 4, 5 or 6 slots, or more). In some example embodiments, the PSFCH 114 may be allocated in every sidelink slot (N=1), every second sidelink slot (N=2), or every fourth sidelink slot (N=4), in accordance with the PSFCH periodicity (N). Although the SCI indicates the resource in up to 3 slots, in some embodiments, the TBS is determined for only the current slot, however the number of frequency resources for the indication should to be the same. In some embodiments, the SCI may include signalling indicating the PSFCH. A primary factor for TBS determination in the SCI is the modulation and coding scheme (MCS) for the data to be transmitted or received on the PSSCH and the reserved allocation.

In some embodiments, the UE is configured to transmit the PSSCH in consecutive symbols within the current slot 102 that are configured for sidelink and is configured to refrain from transmitting the PSSCH in symbols which are configured for use by PSFCH 114, if PSFCH 114 is configured in the current slot 102. The UE may also be configured to refrain from transmitted the PSSCH in symbols immediately preceding the symbols which are configured for use by PSFCH 114, if PSFCH 114 is configured in the current slot. The UE may also be configured to refrain from transmitted the PSSCH in a last symbol of the current slot 102 that is configured to sidelink. In these embodiments, the PSSCH is not transmitted in resource elements of the current slot 102 that are not available for transmission of the PSSCH.

In some embodiments, to determine the TBS, the UE may be configured to exclude REs of the current sidelink slot 102 occupied by a channel state information reference signal (CSI-RS) and exclude REs of the current sidelink slot used for TX/RX and RX/TX switching 110. In some embodiments, to determine the TBS, the UE may also be configured to exclude REs of the current sidelink slot 102 that are distorted due to automatic gain control (AGC) symbol impact 108 (see FIG. 2).

In some embodiments, for transmission of the TB within multiple transmission time intervals (TTIs), the UE may be configured to encode the SCI to indicate a reservation of PSSCH resources for each of the multiple TTIs within the current scheduling window. These embodiments are described in more detail below.

In some embodiments, when the UE is operating as a receiving (RX) UE, the UE may be configured to determine a TBS size for reception of the TB on the PSSCH resources 106 within the current sidelink slot 102. In some embodiments, the processing circuitry of the UE may comprise a baseband processor, and the memory of the UE may be configured to store the SCI.

Some embodiments disclosed herein may utilize a two-stage SCI. In these embodiments, the two-stage SCI comprising a first stage SCI and a second stage SCI. In these embodiments, to determine the TBS, PSCCH resources reserved for both the first stage SCI and the second stage SCI may be excluded. In these embodiments, the resources reserved for $1^{st}$ and $2^{nd}$ stage PSCCH may be excluded for the TBS calculation.

In these embodiments, the first stage (1st-stage) SCI may be conveyed by the PSCCH, while the second stage (2nd-stage) SCI may be conveyed using the PSSCH resources. The 1st-stage SCI mainly carries the information regarding the PSSCH resources and the information for decoding the 2nd-stage SCI (e.g., time-frequency resources of PSSCH/PSFCH, the priority of this TB transmission, etc.). The 2nd-stage SCI mainly carries the remaining scheduling information for the PSSCH decoding by the target UE. The PSFCH resources may be conveyed by the second stage SCI.

In some embodiments, a 2-stage SCI procedure may be used in 5G-NR communication networks. More specifically, the control channel information (SCI) is split into two separate entities (e.g., $1^{st}$-stage SCI and $2^{nd}$-stage SCI) with a different purpose and even different coverage. The first stage SCI carries information for the sensing procedure (e.g., time and frequency resources for the PSSCH detection and decoding) and a pointer to the resources of the second stage. The second stage may be communicated via the PSSCH and carries all remaining information required to demodulate the shared channel as well as HARQ and CSI related procedures.

In accordance with some embodiments, during calculation of the TBS in the NR downlink (DL) system it is assumed that the number of REs for PDSCH per PRB is constant across the whole allocation of the PDSCH. Afterwards the TBS is determined by multiplying the number of REs with the spectral efficiency defined by the MCS. However, in the case of the sidelink and especially agreed option on multiplexing of PSCCH and PSSCH, the assumption of constant PSSCH REs across all allocated PRBs is not valid. In contrast to the DL, the SL also has to handle the effect of symbols possibly being not usable due to the AGC adaptation.

The example of FIG. 1 illustrates the problem. In this example, the PSCCH is not allocated in all PRBs, the PRB structure is not uniform and the calculation would lead to a wrong result. This example uses a Rel. 15 Type-I CP-OFDM DMRS with multiplexing of DMRS and PSSCH symbols in the same OFDM symbol. For the illustrated example, the calculation of the number of REs would looks as follows:

$$N'_{RE} = N_{sc}^{RB} N_{symb}^{sh} - N_{DMRS}^{PRB} - N_{oh}^{PRB}$$

$$N_{RE} = \min(156, N'_{RE}) \cdot N_{PRE}$$

Inserting the numbers for the example yields:

$$N'_{RE} = 12 \cdot 12 - 12 - 0 = 132.$$

$$N'_{RE} = \min(156, 132) \cdot 10 = 1320$$

Even for the ideal case without any additional channels, the correct result would not be obtained as these formulas implicitly assume a uniform structure of the allocated channels for each PRB. Since this is not the case for the system to get the correct number of REs, the following equation may be used:

$$N_{RE} = n_{PRB} N_{sc}^{RB} N_{symb}^{sh} - N_{RS}^{RE} - N_{PSCCH}^{RE}$$

$$N_{RE} = 12 \cdot 12 \cdot 10 - 96 - 288 = 1056$$

in this case, the parameters $N_{RS}^{RE}$ and $N_{PSCCH}^{RE}$ represent the number of REs allocated for sidelink RS (DMRS) and PSCCH allocation/configuration.

Problematic TBS Determination Scenarios for NR V2X SIDELINK

Figure 2:
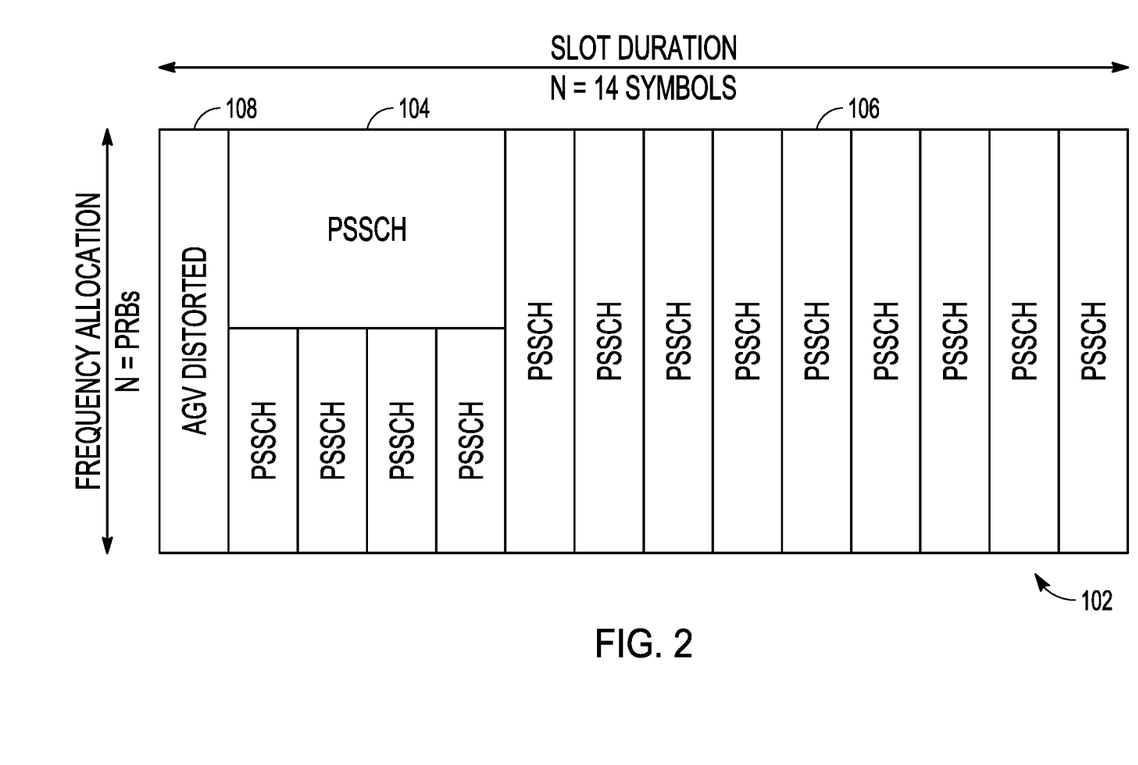
FIG. 2 illustrates a sidelink slot having a resource allocation for NR-V2X in accordance with some embodiments.

The following aspects can affect TBS determination procedure for NR V2X sidelink communication:
PSCCH allocation in part of the PSSCH sub-channels and symbols
Dynamic CSI-RS resource allocation
Sidelink DMRS for PSSCH
AGC symbol
TX-RX switching symbol
PSFCH resource allocation
Different slot structures with variable number of REs from slot to slot that may be used for sidelink operation in licensed carriers
Slot aggregation/concatenation PSCCH and Sidelink TBS Determination The PSCCH channel for NR V2X design is allocated within PSSCH region and may occupy only part of PSSCH symbols and PRBs (see e.g., FIG. 2). Therefore, for TBS determination procedure that assume the same overhead per PRB is not valid. The number of available REs (resource elements) should be determined across PSSCH allocation by excluding REs occupied by PSCCH (PSCCH overhead). Therefore, the number of REs can be calculated explicitly using formula bellow:

$$N_{RE} = n_{PRB} N_{sc}^{RB} N_{symb}^{sh} - N_{RS}^{RE} - N_{PSCCH}^{RE}$$

Another alternative is to estimate effective overhead per PRB for given PSSCH allocation and apply legacy procedure for calculation of $N_{RE}$ $$N_{oh}^{PRB} = (n_{PRB}^{PSSCH} N_{sc}^{RB} N_{symb}^{sh} - n_{PRB}^{PSCCH} N_{sc}^{RB} N_{symb}^{oh}) / n_{PRB}^{PSSCH}$$

$$N'_{RE} = N_{sc}^{RB} N_{symb}^{sh} - N_{DMRS}^{PRB} - N_{oh}^{PRB}$$

$$N_{RE} = \min(156, N'_{RE}) n_{PRE}$$

The RE overhead associated with the PSCCH can be directly determined from the resource pool configuration of the PSCCH/PSSCH and actual dynamic allocation of PSCCH (number of REs occupied including the possibly dynamic allocation of the second stage SCI) and PSSCH (number of sub-channels used for transmission).

Dynamic CSI-RS, PTR-RS and other resource allocation and Sidelink TBS Determination Similar to the PSCCH, the overhead associated with sidelink CSI-RS, PTR-RS or other dynamic allocated resources may need to be taken into account for NR V2X sidelink TBS determination. CSI-RS is used as an example, but the argument is valid for any resources that can be dynamically added to the system. The sidelink CSI-RS may or may not be present in each transmission of the given or different HARQ processes. How presence of CSI-RS is taken into account in TBS determination should be interpreted in a common way by transmitter and receiver. The following options can be used:

1) Alt-1. REs that occupied by CSI-RS are not used for TBS determination independently of whether CSI-RS is transmitted or not
2) Alt-2. Number of PSSCH REs is reduced by the amount of REs occupied by CSI-RS
3) Alt-3. Number of PSSCH REs is reduced by the preconfigured amount of REs to reflect the possible impact of CSI-RS
4) Alt-4. Number of PSSCH REs per PRB is reduced by the $N_{oh}^{CSI-RS}$, where $N_{oh}^{CSI-RS}$ is preconfigured The UE may select an MCS that would not have problems for the case that CSI-RS are present in some of the retransmissions.

AGC Symbol and Sidelink TBS Determination

In sidelink communication, the first symbol of sidelink transmission may be corrupted by AGC at the receiver side (see e.g., FIG. 2). RX UE may simply puncture this symbol and Therefore, effectively increase code-rate at RX. If AGC symbol is taken into account in the TBS determination this may improve robustness for reception. The following design options can be used with respect to AGC issue for sidelink TBS determination:

Alt-1. REs that occupied by first symbol of PSSCH are not used for TBS determination independently of the assumption on whether those corrupted at RX or not
1) Alt-2. Number of PSSCH REs is reduced by the amount of REs occupied by one symbol of PSSCH allocation (i.e. number of symbols is effectively reduced by one)
2) Alt-3. Number of PSSCH REs is reduced by the preconfigured amount of REs to reflect impact of AGC symbol
3) Alt-4. Number of PSSCH REs per PRB is reduced by the $N_{oh}^{AGC}$, where $N_{oh}^{AGC}$ is preconfigured The UE may select an MCS that would not have problems for the case when AGC symbol is punctured or not punctured by UE RX.

TX-RX Switching Symbol and Sidelink TBS Determination

Similar to AGC symbol there are following options how to take into account symbols used for TX-RX/RX-TX switching in TBS determination. Similar alternatives can be considered:

1) Alt-1. REs that utilized for TX/RX and RX/TX switching are not used for TBS determination by both TX and RX UE
2) Alt-2. Number of PSSCH REs is reduced by the amount of REs occupied by one symbol for the purpose of TX-RX switching (i.e. number of symbols is effectively reduced by one)
3) Alt-3. Number of PSSCH REs is reduced by the preconfigured amount of REs to reflect impact of TX-RX/RX-TX switching symbol
4) Alt-4. Number of PSSCH REs per PRB is reduced by the $N_{oh}^{TX-RX}$, where $N_{oh}^{TX-RX}$ is preconfigured PSFCH and Sidelink TBS Determination In case of PSFCH the procedure for TBS determination may be a bit more specific. The PSFCH channel is allocated every N slots where N=1, 2, 4. The PSFCH channel is allocated at the end of the slot and use two symbols for transmissions (one of them for AGC). Two TX-RX switching intervals are needed one before and one after PSFCH transmission.

FIG. 3 illustrates a sidelink slot with allocated PSFCH in accordance with some embodiments. If PSFCH is semi-statically allocated every slot, i.e. N=1 there no issue and TBS determination can be done by reducing number of symbols for PSSCH on amount of symbols occupied by the PSFCH region and associated TX/RX and RX/TX switching gaps. The following alternatives are possible:

Alt-1. Reduce number of REs in PSSCH by excluding REs occupied for PSFCH and TX/RX switching symbols $$N_{RE} = n_{PRB} N_{sc}^{RB} N_{symb}^{sh} - N_{RS}^{RE} - N_{PSCCH}^{RE} - n_{PRB} N_{sc}^{RB} N_{symb}^{PSFCH+TXRX\_Switching}$$

Alt-2. Reduce number of effective REs per PRB on PSFCH and TX/RX switching symbols $$N'_{RE} = N_{sc}^{RB} N_{symb}^{sh} - N_{DMRS}^{PRB} - N_{sc}^{RB} N_{symb}^{PSFCH+TXRX\_Switching}$$

Alt-3. Take into account in $N_{oh}^{PRB}$ $$N_{oh}^{PRB} = N_{oh}^{PRB} + N_{sc}^{RB} N_{symb}^{PSFCH+TXRX\_Switching}$$

Alt-4. No special handling is needed. In the case that a PSFCH is allocated in every slot, or in none of the slots in the configured pool, no special handling is needed as for each retransmission with the same numbers of sub-channels allocated the calculated TBS would be the same. However, it may result in increased CR and potentially lead to non-self-decodable transmissions Case-2: PSFCH is allocated every sidelink $2^{nd}$ or $4^{th}$ slot (N=2 or 4)

If PSFCH is allocated every $2^{nd}$ or $4^{th}$ slot, then different slots have different number of REs for PSSCH transmission. Independently of where PSSCH is transmitted on slots w/o PSFCH or with PSFCH allocated both TX UE and RX UE should have a common understanding how TBS determination was calculated. The following options should be separately considered:

Option 1: The TBS determination rule is not dependent on slot where PSCCH/PSSCH was initially transmitted for a given TB Option 2: The TBS determination rule is dependent on slot where PSCCH/PSSCH was initially transmitted for a given TB For Option 1, the TBS determination rule may be pre-configured for each value of N. For instance, different values of $N_{oh}^{PRB}$ can be configured per pool/carrier etc.

For Option 2, the following alternatives can be considered:

Alt.-1: UE signals in PSCCH/SCI specific parameter for TBS determination e.g. indicates slot type (i.e. with PSFCH or w/o PSFCH) that was used for TBS determination during initial and Therefore, subsequent transmissions. The TBS determination rule itself may be semi-statically configured for each slot type and value N as for Case-1 considered above.

Alt.-2: SCI signals all forward (future) and backward (past) resources used for transmission of a given TB, so that UE can derive slot type used for initial PSSCH transmission and thus TBS determination. The TBS determination rule itself may be semi-statically configured for each slot type and value N as for Case-1 considered above.

Slot Concatenation and TBS Determination

And additional aspect is the TBS determination for the case of slot aggregation/concatenation. If from the PSSCH resource signalling in the SCI we can derive that slot aggregation/concatenation is used, the number or resources available for the PSSCH is determined using all aggregated slots.

Variable Slot Structures

And addition special case is the case for a NR V2X SL operation in the licensed spectrum alongside a DL and UL. In this case we can solve the issue in the same way as for PSFCH slots. From system level perspective it has to be know if past SL transmission were using the full slot or the half slot format. This means future transmission or addition RVs can determine the original TBS by calculating with the slot format in the original transmission.

The slot structures with variable number of symbols for PSSCH can be addressed in the same way as proposed to resolve issues with PSFCH as described.

Sidelink Transmissions with CR>1

For the case of large packets, it is desirable to enable transmissions with an effective CR>1 per single slot. In this case a (pre)-configured scaling of the TBS values can be configured. It is also possible to scale the CR value in the MCS table. A third alternative is for the in this document predefined overhead and resource that can be (pre)-configured for the TBS determination. By setting these to values to a higher value than the actual allocation the resulting TBS would also be scaled. As this is only interesting for transmission with the highest modulation order only these should be scaled, to not impact transmissions with the lowest MCS.

Figure 4:
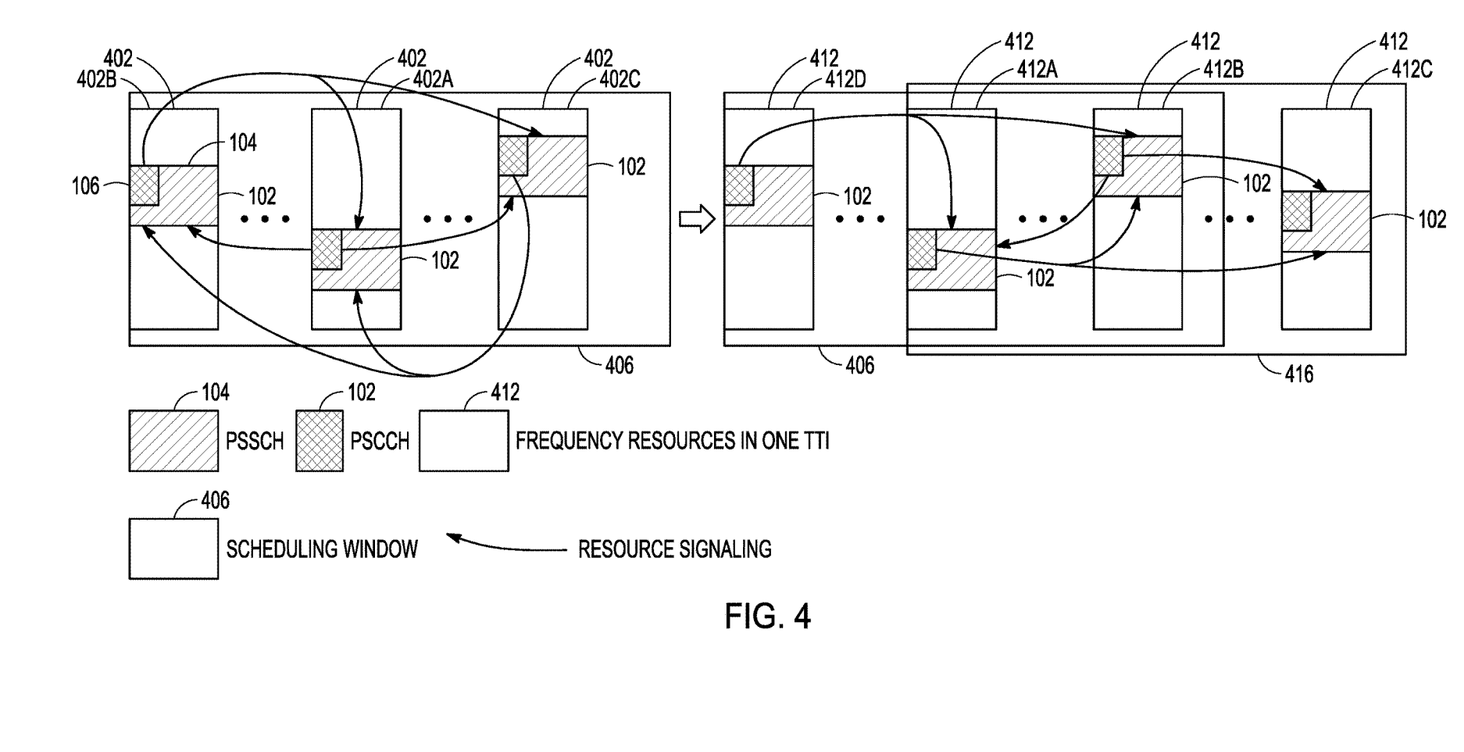
FIG. 4 illustrates signalling of sidelink resources in accordance with some embodiments.

FIG. 4 illustrates signalling of sidelink resources in accordance with some embodiments. In these embodiments, the UE is configured for New Radio (NR) vehicle-to-everything (V2X) (NR V2X) sidelink transmission in a fifth generation (5G) network. In these embodiments, for transmission of a transport block (TB) within multiple transmission time intervals (TTIs) 402, the UE may be configured to encode an SCI for transmission on the PSCCH 106 within a current TTI 402A of a current scheduling window 406. The SCI may be encoded to indicate a reservation of PSSCH resources for each of the multiple TTIs 402 within the current scheduling window 406 and including a reservation of PSSCH resources for the current TTI 402A. The SCI may also be included to indicate a reservation of PSSCH resources for one more other TTIs including up to one or more prior TTIs 402B within the current scheduling window and up to one or more future TTIs 402C within the current scheduling window 406. In these embodiments, multiple TTI transmissions may be signaled for the same TB.

In some embodiments, for a next scheduling window 416 when additional PSSCH resources, not previously indicated by an SCI, are to be used for transmission of the TB, the UE may be configured to encode a second SCI for transmission on the PSCCH within a current TTI 412A of the next scheduling window 416. In these embodiments, the second SCI may be encoded to indicate a reservation of PSSCH resources for each of the multiple TTIs 412 within the next scheduling window 416, including a reservation of PSSCH resources for the current TTI 412A, and a reservation of PSSCH resources for up to one more other future TTIs 412 within the next scheduling window 416 including up to one more other future TTIs 412C that were not within the prior scheduling window 406.

In some embodiments, the SCI may be encoded to refrain from indicating a reservation of PSSCH resources for a TTI that is not within the current scheduling window. In these embodiments, the second SCI would not include a reservation of PSSCH resources in TTI 412D since TTI 412 is in prior scheduling window 406.

In some embodiments, to signal multiple TTI transmissions for a same TB, the SCI may be encoded to indicate the PSSCH resources of a TTI using a resource indication value (MV) based on jointly encoding a subchannel offset and a number of subchannels within a subchannel set, although the scope of the embodiments is not limited in this respect.

In some embodiments, to signal multiple TTI transmissions for a same TB, the SCI may be encoded to indicate the PSSCH resources of a TTI based on an offset from the present TTI, although the scope of the embodiments is not limited in this respect.

In some embodiments, to signal multiple TTI transmissions for a same TB, the SCI may be encoded to indicate the PSSCH resources, separately for time and frequency, jointly for time and frequency, or to indicate re-use of any time and/or frequency resources between the multiple TTIs, although the scope of the embodiments is not limited in this respect.

*In the case of resource sensing for intendent resource selection it is of benefit that one SCI is signaling PSSCH resources allocated for the transmission of the same TB in multiple slots. As the SCI in the PSCCH has to be send with the most robust physical layer format, every additional bit in the SCI has an influence on the overall coverage. Thus, embodiments described herein provide an efficient solution for the required signaling of the PSSCH resources in multiple TTIs. Embodiments disclosed herein provide efficient signaling of multi TTI transmissions within the control channel of the sidelink.

In some embodiments, a look up table for only signaling the non-redundant resource configuration is generated. In addition, different specific configurations are implicitly treated as slot aggregation signaling. A minimal amount of bits in the SCI are signaled. This enables the control channel to have maximum coverage with minimized resources.

FIG. 4 shows the different possible signaling. In a) all transmissions are within the same selection window. This means that the resource signaling only need to signal the resources within this window. In contrast in b) the first transmission signals two following transmission. But in the second transmission it is decided that possibly additional resources are needed. Therefore, in the second transmission additional PSCCH resources are signaled. As for this case the number of signaled transmissions is limited to three there is no signaling resources left to point to the resources of the preceding transmission, thus only the future resources are signaled.

To enhance the reliability of transmissions for NR V2X blind retransmissions should be enabled in a similar fashion as in LTE V2X. These multiple resources need to be signaled by the control channel. In addition, it is of benefit to signal not only the next but all transmissions belonging to the same TB (Transmission Block). In addition, this has benefits for the resource sensing procedure as this signaling of future resources can be interpreted as resource reservation. As every additional bit in the SCI has a significant impact on the performance, this signaling needs to be as efficient as possible. The following paragraphs describe in detail all aspects of the signaling.

Signaling of Resources in the Current TTI:

For the demodulation of the resource in the current TTI the position and number of the allocated sub-channels need to be signaled. Additional assumptions can reduce this signaling. For example, it is possible to assume that the control channel is always only present in the sub-channel containing the PRBs with the smallest PRB index of the whole transmission. This means only the size of the allocation in terms of sub-channels need to be signaled as the starting position can be directly inferred from the position of the PSCCH.

Particular option of current TTI signaling may employ RIV (resource indication value) approach which jointly encodes sub-channel offset and number of sub-channels within a given sub-channel set.

If $N_s - 1 \leq \text{floor}\left(\frac{S}{2}\right)$ $RIV = S \cdot (N_S - 1) + i$ Else $RIV = S \cdot (S - N_S + 1) + (S - 1 - i)$ Where, $N_S$—number of allocated sub-channels, S—number of sub-channels in a SL BWP, i—lowest index of the allocated sub-channel.

Signaling of Frequency Resources of Transmissions in Other TTIs:

To be able to identify future or past resources of the same TB from the same transmitter it is necessary to know the frequency resources. The signaling overhead can be reduced if additional side information are used. For example, the transmission can be restricted to use the same amount for sub-channel for each transmission. This means only the starting sub-channel needs to be signaled for each TTI.

Signaling of the Time Location of Transmissions in Other TTIs:

For this signaling we always assume that all transmission are within a signaling window. The window size needs to be (pre)-configured. Separately signaling the position of each location is a large overhead. It is possible to construct a Look Up Table (LUT) to signal all possibilities that are not redundant. The LUT also needs to take into account that each signaling does not necessarily signal the maximum number of possible allocations. The LUT can be constructed in containing all possibilities of selection 0 to N values out of M. Where M is the (pre)-configured signaling window size and N is the maximum number of transmissions within this window. Another way to construct the LUT would be to simply signal the distances between conductive transmissions. This means instead of the location inside the window only the distance between adjacent transmissions is signaled. For signaling the distance it is also important that the number of transmissions is also signaled.

The signaling of N TTIs in a window of M slots may be defined as follows using combinatorial index approach similar to the one used for EPDCCH or SPDCCH PRB-pair resource set configuration. That is, a combinatorial index r corresponding to N TTI indexes from window M, with $\{k_i\}_{i=0}^M$, $(1 \leq k_i \leq M, k_i < k_{i+1})$ and given by equation $\sum_{i=0}^{N-1} \binom{M - k_1}{N - k_i}$, where $\binom{y}{y} = \begin{cases} \binom{x}{y} & x \geq y \\ 0 & x < y \end{cases}$ is the extended binomial coefficient, resulting in unique label $r \in \left\{0, \ldots, \binom{M}{N} - 1\right\}$.

This rule can be extended to signal 0, 1, ..., N resources out M by concatenation of all possible combinatorial indexes, like $r \in \Big\{0, \ldots, \binom{M}{N} - 1, \binom{M}{N}, \ldots, \binom{M}{N} + \binom{M}{N-1} - 1,$ $\binom{M}{N} + \binom{M}{N-1}, \ldots, \binom{M}{N} + \binom{M}{N-1} + \binom{M}{N-2} - 1, \ldots\Big\}$ It should be clarified, that SCI/PSCCH indicates resource for N TTIs, where N−1 TTIs are from past or future. Therefore, one TTI is already identified in the window M, thus the combinatorial index should signal N−1 TTIs in a window M−1.

In a special case of N=2 and 3 and window size M, when both numbers 2 and 3 need to be supported by the same indexing, the combinatorial index approach can be used by letting N'=3 and M'=M+1. In this case, when N TTIs lay into window M, all N TTIs are assumed signaled. When one TTI from N lays to the last TTI of window M' (M+1), this TTI is not assumed available/valid, while other N−1 TTIs laying into window M are interpreted as signaled.

Signaling of Transmission Index in the Current Window:

As from the signaling of the time resources it is not clear which the current transmission is within the window this also needs to be signaled. This means that a transmission index inside the current selection window also needs to be added to the transmission. For example, for N TTI transmission, a signaling of size ceil(log 2(N)) is needed to indicate the index.

Signaling to Identify that Transmissions Belong to the Same TB:

As additional resources can belong to the same TB but are not within the same transmission window it needs to be identifiable that they belong to the same transmission. Thus, even for broadcast a HARQ ID plus new data indication (NDI) needs to be used.

Additional Side Information that can be Used

If the same resources in adjacent slots are signaled this can be interpreted as slot aggregation is used. Thus, this signaling framework allows to signal slot aggregation up to the maximum number of slots (pre)-configured to be within a sensing window. These aggregated slots can either contain control information themselves or completely omit the control information.

Joint Time Frequency Signaling for Resource Reservation:

In most current resource signaling schemes the time and frequency resources are signaled independently. It is possible to jointly signal the time and frequency resource using a combinatorial indexing method. Assuming that all $N_{max}$ transmissions have the same amount of sub-channels allocated and there are in total $N_{CH}$ sub-channels available in the resource pool. The number of combinations and thus the combinatorial index can be calculated with the following formula:

$\sum_{n=0}^{N_{max}-1} \binom{W}{n} \sum_{m=1}^{N_{CH}} (N_{CH} + 1 - m)^n$

It is also possible that the number of allocated subchannels in each allocation is different. This would lead to the following formula for the number of combinations and the combinatorial index:

$$\sum_{n=0}^{N_{max}-1} \binom{W}{n} \left( \sum_{m=1}^{N_{CH}} (N_{CH} + 1 - m) \right)^n N_{CH}$$

Also the case that the initial transmission has only a single sub-channel allocated needs to be signaled. This could just be a separate bit. Or it could be combined inside the TTI index if the number of TTI indices is not fully representing N bits. An example would be that a maximum of 3 TTI can be signaled. This means at least 2 bit are necessary for the TTI index. However, as there are only 3 TTI the $4^{th}$ value has no meaning and could be used to represent and reduced size initial transmission.

Figure 5:
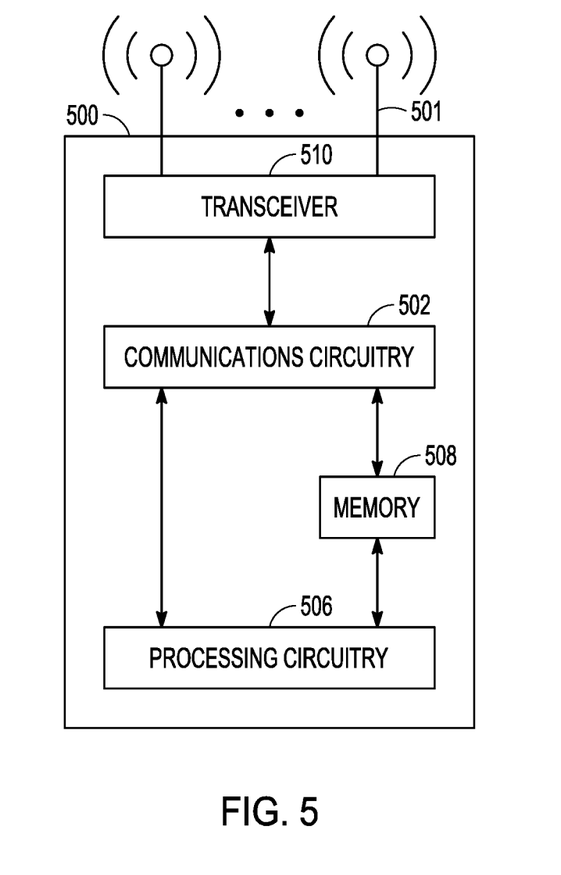
FIG. 5 illustrates a functional block diagram of a user equipment (UE) in accordance with some embodiments.

FIG. 5 illustrates a functional block diagram of a user equipment (UE) 500 in accordance with some embodiments. The user equipment 500 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The user equipment 500 may include communications circuitry 502 and a transceiver 510 for transmitting and receiving signals to and from other user equipment using one or more antennas 501. The communications circuitry 502 may include circuitry that can operate the physical layer (PHY) communications and/or medium access control (MAC) communications for controlling access to the wireless medium, and/or any other communications layers for transmitting and receiving signals. The user equipment 500 may also include processing circuitry 506 and memory 508 arranged to perform the operations described herein. In some embodiments, the communications circuitry 502 and the processing circuitry 506 may be configured to perform operations detailed in the above figures, diagrams, and flows.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the user equipment 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices and other storage devices and media.

In some embodiments, the user equipment 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the user equipment 500 may include one or more antennas 501. The antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the user equipment 500 may include one or more of a keyboard, a display, a non-volatile memory port, multiple antennas, a graphics processor, an application processor, speakers, and other mobile device elements. The display may be an LCD screen including a touch screen.

Although the user equipment 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the user equipment 500 may refer to one or more processes operating on one or more processing elements.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a user equipment (UE) configured for New Radio (NR) sidelink transmission, the apparatus comprising: processing circuitry; and memory,
   wherein when the UE is operating as a transmitting (TX) UE for transmission of a NR sidelink communication to another UE without traversing a network node, the processing circuitry is configured to:
   determine a transport block size (TBS) for transmission of a transport block (TB) within a current sidelink slot;
   encode a physical sidelink shared channel (PSCCH) for transmission within the current sidelink slot, the PSCCH encoded to include sidelink control information (SCI), the SCI to indicate a reservation of physical sidelink shared channel (PSSCH) resources within up to three sidelink slots including the current sidelink slot; and encode a PSSCH for transmission within available PSSCH resources of the current sidelink slot, the PSSCH transmission comprising the TB, wherein to determine the TBS, the processing circuitry is configured to determine number of resource elements (REs) within the current sidelink slot that are available for transmission of the PSSCH by at least:

excluding a number of REs of the current sidelink slot occupied by the PSCCH, excluding a number of REs of the current sidelink slot occupied by sidelink PSSCH demodulation reference signals (DMRS) based on a sidelink PSSCH DMRS time pattern indicated by higher layers; and excluding a number of REs of the current sidelink slot that include a physical sidelink feedback channel (PSFCH) based on a PSFCH period indicated by the higher layers, if the PSFCH is configured for the current sidelink slot, and wherein the memory is configured to store the SCI.

2. The apparatus of claim 1, wherein the SCI comprises a two-stage SCI comprising a first stage SCI and a second stage SCI, and wherein to determine the TBS, the processing circuitry is configured to exclude a number of PSSCH REs of the current sidelink slot for transmission of the second stage SCI.

3. The apparatus of claim 2, wherein the processing circuitry is to configure the UE to transmit the PSSCH in consecutive symbols within the current slot that are configured for sidelink and refrain from transmitting the PSSCH in symbols which are configured for use by the PSFCH, if the PSFCH is configured in the current slot, in symbols immediately preceding the symbols which are configured for use by the PSFCH, if the PSFCH is configured in the current slot, and in a last symbol of the current slot that is configured for sidelink.

4. The apparatus of claim 3 wherein to determine the TBS, the processing circuitry is further configured to: exclude a number of REs of the current sidelink slot occupied by a channel state information reference signal (CSI-RS); and exclude a number of REs of the current sidelink slot used for TX/RX and RX/TX switching.

5. The apparatus of claim 4, wherein to determine the TBS, the processing circuitry is further configured to: exclude a number of REs of the current sidelink slot that are distorted due to automatic gain control (AGC) symbol impact.

6. The apparatus of claim 5, wherein for transmission of the TB within multiple transmission time intervals (TTIs), the processing circuitry is configured to encode the SCI to indicate a reservation of PSSCH resources for each of the multiple TTIs within the current scheduling window.

7. The apparatus of claim 2, wherein when the UE is a receiving (RX) UE, the processing circuitry is configured to determine a TBS size for reception of the TB on the PSSCH resources within the current sidelink slot.

8. The apparatus of claim 1, wherein the processing circuitry comprises a baseband processor to be coupled to one or more antenna.

9. A non-transitory computer-readable storage medium that stores instructions for execution by processing circuitry of a user equipment (UE) configured for New Radio (NR) sidelink transmission, wherein when the UE is operating as a transmitting (TX) UE, the processing circuitry is configured to:

wherein when the UE is operating as a transmitting (TX) UE for transmission of a NR sidelink communication to another UE without traversing a network node, the processing circuitry is configured to:

determine a transport block size (TBS) for transmission of a transport block (TB) within a current sidelink slot;

encode a physical sidelink shared channel (PSCCH) for transmission within the current sidelink slot, the PSCCH encoded to include sidelink control information (SCI), the SCI to indicate a reservation of physical sidelink shared channel (PSSCH) resources within up to three sidelink slots including the current sidelink slot; and encode a PSSCH for transmission within available PSSCH resources of the current sidelink slot, the PSSCH transmission comprising the TB, wherein to determine the TBS, the processing circuitry is configured to determine number of resource elements (REs) within the current sidelink slot that are available for transmission of the PSSCH by at least:

excluding a number of REs of the current sidelink slot occupied by the PSCCH, excluding a number of REs of the current sidelink slot occupied by sidelink PSSCH demodulation reference signals (DMRS) based on a sidelink PSSCH DMRS time pattern indicated by higher layers; and excluding a number of REs of the current sidelink slot that include a physical sidelink feedback channel (PSFCH) based on a PSFCH period indicated by the higher layers, if the PSFCH is configured for the current sidelink slot.

10. The non-transitory computer-readable storage medium of claim 9, wherein the SCI comprises a two-stage SCI comprising a first stage SCI and a second stage SCI, and wherein to determine the TBS, the processing circuitry is configured to exclude a number of PSSCH REs of the current sidelink slot for transmission of the second stage SCI.

11. The non-transitory computer-readable storage medium of claim 10, wherein the processing circuitry is to configure the UE to transmit the PSSCH in consecutive symbols within the current slot that are configured for sidelink and refrain from transmitting the PSSCH in symbols which are configured for use by the PSFCH, if the PSFCH is configured in the current slot, in symbols immediately preceding the symbols which are configured for use by the PSFCH, if the PSFCH is configured in the current slot, and in a last symbol of the current slot that is configured for sidelink.

12. The non-transitory computer-readable storage medium of claim 11 wherein to determine the TBS, the processing circuitry is further configured to: exclude a number of REs of the current sidelink slot occupied by a channel state information reference signal (CSI-RS); and exclude a number of REs of the current sidelink slot used for TX/RX and RX/TX switching.

13. The non-transitory computer-readable storage medium of claim 12, wherein to determine the TBS, the processing circuitry is further configured to: exclude a number of REs of the current sidelink slot that are distorted due to automatic gain control (AGC) symbol impact.

14. The non-transitory computer-readable storage medium of claim 13, wherein for transmission of the TB within multiple transmission time intervals (TTIs), the processing circuitry is configured to encode the SCI to indicate a reservation of PSSCH resources for each of the multiple TTIs within the current scheduling window.

15. The non-transitory computer-readable storage medium of claim 10, wherein when the UE is a receiving (RX) UE, the processing circuitry is configured to determine a TBS size for reception of the TB on the PSSCH resources within the current sidelink slot.

16. A system of a user equipment (UE) configured for New Radio (NR) sidelink transmission, the system comprising:
one or more antennas;
front-end circuitry coupled to the one or more antennas;
processing circuitry including a baseband processor, coupled to the front end circuitry; and
memory,
wherein when the UE is operating as a transmitting (TX) UE for transmission of a NR sidelink communication to another UE, via the one or more antennas, without traversing a network node, the processing circuitry is configured to:
determine a transport block size (TBS) for transmission of a transport block (TB) within a current sidelink slot;
encode a physical sidelink shared channel (PSCCH) for transmission within the current sidelink slot, the PSCCH encoded to include sidelink control information (SCI), the SCI to indicate a reservation of physical sidelink shared channel (PSSCH) resources within up to three sidelink slots including the current sidelink slot; and
encode a PSSCH for transmission within available PSSCH resources of the current sidelink slot, the PSSCH transmission comprising the TB,
wherein to determine the TBS, the processing circuitry is configured to determine number of resource elements (REs) within the current sidelink slot that are available for transmission of the PSSCH by at least:
excluding a number of REs of the current sidelink slot occupied by the PSCCH,
excluding a number of REs of the current sidelink slot occupied by sidelink PSSCH demodulation reference signals (DMRS) based on a sidelink PSSCH DMRS time pattern indicated by higher layers; and
excluding a number of REs of the current sidelink slot that include a physical sidelink feedback channel (PSFCH) based on a PSFCH period indicated by the higher layers, if the PSFCH is configured for the current sidelink slot, and
wherein the memory is configured to store the SCI.

17. The system of claim 16, wherein the SCI comprises a two-stage SCI comprising a first stage SCI and a second stage SCI, and wherein to determine the TBS, the processing circuitry is configured to exclude a number of PSSCH REs of the current sidelink slot for transmission of the second stage SCI.

18. The system of claim 17, wherein the processing circuitry is to configure the UE to transmit the PSSCH in consecutive symbols within the current slot that are configured for sidelink and refrain from transmitting the PSSCH in symbols which are configured for use by the PSFCH, if the PSFCH is configured in the current slot, in symbols immediately preceding the symbols which are configured for use by the PSFCH, if the PSFCH is configured in the current slot, and in a last symbol of the current slot that is configured for sidelink.

19. The system of claim 18 wherein to determine the TBS, the processing circuitry is further configured to: exclude a number of REs of the current sidelink slot occupied by a channel state information reference signal (CSI-RS); and exclude a number of REs of the current sidelink slot used for TX/RX and RX/TX switching.

20. The system of claim 19, wherein to determine the TBS, the processing circuitry is further configured to: exclude a number of REs of the current sidelink slot that are distorted due to automatic gain control (AGC) symbol impact.

* * * * *

UNITED STATES PATENT AND TRADEMARK OFFICE
CERTIFICATE OF CORRECTION

| | | |
|---|---|---|
| PATENT NO. | : 11,690,045 B2 | |
| APPLICATION NO. | : 16/987001 | |
| DATED | : June 27, 2023 | |
| INVENTOR(S) | : Roth et al. | |

It is certified that error appears in the above-identified patent and that said Letters Patent is hereby corrected as shown below:

On the Title Page

In item (57), in "Abstract", in Column 2, Line 6, delete "shared" and insert --control-- therefor In the Specification In Column 2, Line 11, delete "shared" and insert --control-- therefor In Column 2, Line 50, after "should", delete "to"

In Column 7, Line 39, after "PSCCH", insert --resources--

In the Claims

In Column 2, Line 64, in Claim 1, delete "shared" and insert --control-- therefor In Column 13, Line 54, in Claim 6, delete "the" and insert --a-- therefor In Column 14, Line 7, in Claim 9, delete "shared" and insert --control-- therefor In Column 14, Line 54, in Claim 12, after "(CSI-RS);", delete a linebreak In Column 14, Line 67, in Claim 14, delete "the" and insert --a-- therefor In Column 15, Line 12, in Claim 16, delete "front end" and insert --front-end-- therefor In Column 15, Line 21, in Claim 16, delete "shared" and insert --control-- therefor Signed and Sealed this
Sixteenth Day of April, 2024

Katherine Kelly Vidal
*Director of the United States Patent and Trademark Office*